United States Patent [19]
Massmann et al.

[11] Patent Number: 5,938,400
[45] Date of Patent: Aug. 17, 1999

[54] LOADING AND UNLOADING APPARATUS, IN PARTICULAR FOR LOADING AND UNLOADING PRESSES

[75] Inventors: Hans-Joachim Massmann; Kurt Weiser, both of Gundelsheim, Germany

[73] Assignee: Fibro GmbH, Weinsberg, Germany

[21] Appl. No.: 08/656,380

[22] Filed: May 31, 1996

[30] Foreign Application Priority Data

May 31, 1995 [DE] Germany .......................... 195 19 964

[51] Int. Cl.$^6$ .................................. B65G 65/08

[52] U.S. Cl. ................... 414/752; 198/468.2; 198/468.4

[58] Field of Search .................................. 414/222, 749, 414/751, 752; 901/16, 21; 74/490.04, 490.08, 490.09; 198/468.2, 468.4

[56] References Cited

U.S. PATENT DOCUMENTS

| | | | |
|---|---|---|---|
| 3,892,324 | 7/1975 | Faletti, Jr. | 414/749 |
| 4,991,326 | 2/1991 | Weir | 414/751 X |
| 5,520,502 | 5/1996 | Liljengren et al. | 901/21 X |

*Primary Examiner*—Donald W. Underwood
*Attorney, Agent, or Firm*—Townsend and Townsend and Crew LLP

[57] ABSTRACT

A loading and unloading apparatus, in particular for the loading and unloading of presses, comprises a horizontally extending arm which is arranged on a carrier and which is moveable in the direction of its longitudinal axis and also vertically, and which has a gripper device for the parts to be handled. For the acceleration of the loading and unloading procedure, the arm is horizontally moveably guided relative to the carrier, and the gripper device is arranged on a gripper carriage guided on the arm, with the gripper carriage being moveable between the two ends of the arm.

9 Claims, 3 Drawing Sheets

LOADING AND UNLOADING APPARATUS, IN PARTICULAR FOR LOADING AND UNLOADING PRESSES

BACKGROUND OF THE INVENTION

1. Field of the Invention

The invention relates to a loading and unloading apparatus, and in particular to an apparatus for the loading and unloading of presses.

2. Description of the Prior Art

Automatically operating processing machines, such as, for example, presses, must be automatically loaded with the delivered workpieces to be processed and must be automatically unloaded again after the processing of the workpieces.

In so-called press-lines in which the workpieces are subjected to a plurality of processing steps, one after the other the workpieces must be transferred from one press to the next. This is often referred to as a chain of presses.

In order to keep the cycle times for the automatic processing machines as low as possible, the loading and unloading as well as the transfer must take place as quickly as possible. Moreover, with a chain of processing machines it must also be possible to bridge greater spacings.

SUMMARY OF THE INVENTION

The present invention is based on the object of enabling a loading and unloading of workpieces which is as rapid as possible and also of enabling the fastest possible workpiece transport even over greater distances.

This object is satisfied in that the arm is horizontally moveably guided relative to the carrier and in that the gripper device is arranged on a gripper carriage which is guided on the arm and is moveable between the two ends of the arm.

Through the arrangement of the gripper device on a gripper carriage moveable along the arm, a superposition of two linear movements results, which makes it possible to execute the loading and unloading of a workpiece quickly and simply. As the arm moves into and out of the processing machine during loading and unloading, the gripper carriage is correspondingly moved along the arm so that when the arm has been run into the machine it is located at its run-in end in order to pick up the workpiece or to deposit it, and when the arm is run out of the machine, it is located at its opposite end in order to pick up a new workpiece there or to deposit a processed workpiece.

Through the simultaneous movement of the arm and the gripper carriage arranged thereon, the transport speed of the work-piece corresponds to the sum of the speeds of the arm and the gripper carriage so that the transport of the workpiece takes place in a correspondingly short time. When used for the workpiece transport between adjacent processing machines, large spacings can thus be quickly bridged. A further advantage lies in the fact that the transport of the workpiece is brought about exclusively by linear movements. The movements of the loading and unloading apparatus of the invention are thus easily controllable and programmable.

In accordance with a design of the present invention, a common drive motor arranged on the carrier is provided for the horizontal drive of the arm and for the drive of the gripper carriage, with the horizontal drive of the arm and the drive of the gripper carriage being coupled together via an intermediate transmission, and with the arm and gripper carriage always being driven in the same direction. The intermediate transmission is in particular so laid out that the gripper carriage and the arm always simultaneously achieve their respective end positions. A further simplification of the control and programming of the movement of the gripper device arises in this way in addition to saving a separate motor. The gearing up or gearing down ratio of the intermediate transmission can also be adjustable so that the end position of the carriage, and thus of the gripper device, can be selected.

The arm is preferably driven via a rack and pinion transmission in which the rack is secured to the arm and the pinion is journalled on the carrier. In a likewise preferred manner, the moveable carriage is preferably driven via a belt pulley journalled on the carrier and a toothed belt which extends in the longitudinal direction around the arm, with the gripper carriage being secured to the toothed belt and with the arm in particular having two deflection rolls at its ends over which the toothed belt is guided. In this way the horizontal movements of the arm can be coupled in a particularly suitable manner with the movement of the gripper carriage along the arm so that it is possible to take account of a greater stroke of the gripper carriage relative to the arm.

In accordance with a further layout of the present invention, the drive motor is arranged to the side of the arm. The pinion, the belt pulley and the intermediate transmission are arranged in a line extending transverse to the arm. The arm is thereby preferably formed from two parallel beams connected to form a frame, with the rack and pinion drive for the arm being arranged on one beam, with the belt drive for the gripper carriage being arranged on the other beam, and with the intermediate transmission being arranged between them. This design results in a simple layout of the drives for the arm and the gripper carriage.

In accordance with a further design of the present invention, a round bar is in each case arranged along the two longitudinal sides of the arm, with at least two running wheels which are journalled on the gripper carriage being longitudinally moveable along each bar. The gripper carriage is hereby guided in a simple and secure manner on the arm.

The arm is preferably arranged on a vertical carrier which is vertically moveably journalled in a holder. By moving the vertical carrier, the vertical stroke of the arm can be brought about during the picking up and depositing of workpieces.

If the apparatus of the invention is to be used for the loading and unloading of a processing machine, then the holder for the vertical carrier can be directly secured to the processing machine. If, in contrast, the apparatus of the invention is to be used for a chain of processing machines, then the holder is preferably secured to a running carriage which is moveable along a portal beam extending parallel to the arm, which is arranged between two neighboring processing machines and which spans the spacing between the two loading and unloading positions.

During the transfer loading of workpieces, the running carriage then moves back and forth, in addition to the arm and the gripper carriage arranged thereon, along the portal beam in the horizontal direction between the two processing machines. In this manner three horizontal movements are superimposed and the transport speed is further increased. In this way large transport paths can be rapidly bridged. In particular, the transfer loading of workpieces can take place over larger transport paths, without putting down the workpieces. Naturally, this design with a portal beam and a running carriage can also be used in other ways.

As a whole, a very quickly operating loading and unloading device thus results, which is particularly suitable for use for a chain arrangement of processing machines.

DETAILED DESCRIPTION OF THE PREFERRED EXEMPLARY EMBODIMENTS

Figure 1:
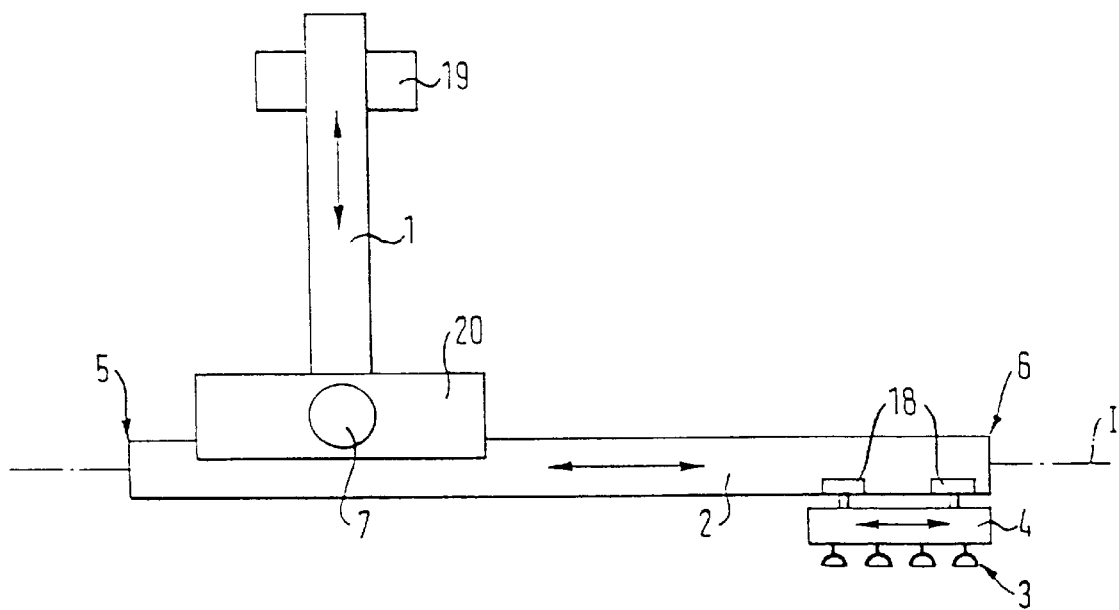
FIG. 1 is a schematic illustration of a first embodiment of the loading and unloading apparatus of the present invention.

The schematic illustration of FIG. 1 shows the horizontally extending arm 2 which is arranged on a vertical carrier 1 and which is moveable relative to the carrier 1 in the direction of its longitudinal axis I. A gripper carriage 4 with a gripper device 3 is arranged on the arm 2 and is moveable between the two ends 5 and 6 of the arm 2.

The horizontal drive of the arm 2 and the drive of the gripper carriage include a common drive motor 7 which is arranged to the side of the vertical carrier 1. The vertical carrier 1 is vertically moveably journalled in a holder 19. At its lower end the vertical carrier 1 has a mounting housing 20 for the horizontal drive of the arm 2 and for the drive of the gripper carriage 4.

Figure 2:
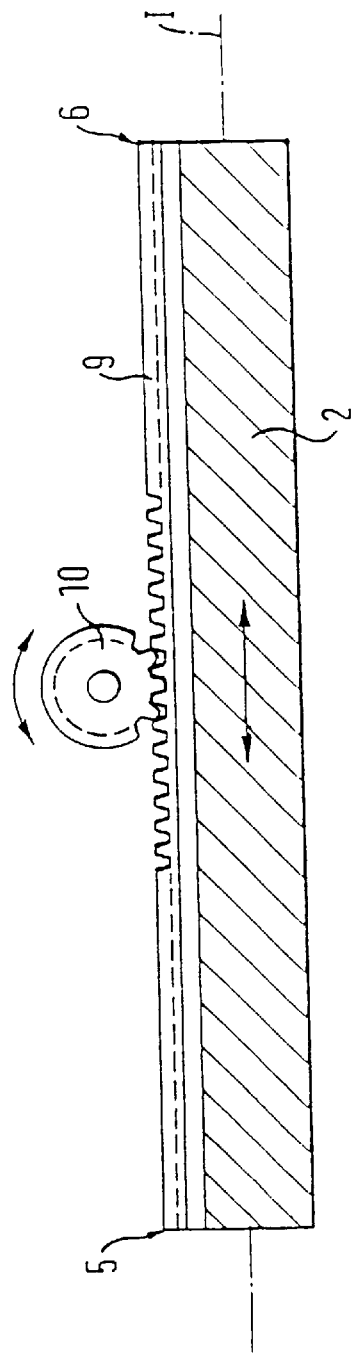
FIG. 2 is a schematic illustration of the arm drive.

The horizontal drive of the arm 2, which is schematically illustrated in FIG. 2, includes a toothed rack 9 secured to the arm 2 which extends substantially over the entire length of the arm 2. A pinion 10 which is driven by the drive motor 7 meshes in the toothed rack 9 in order to move the arm 2 horizontally back and forth.

Figure 3:
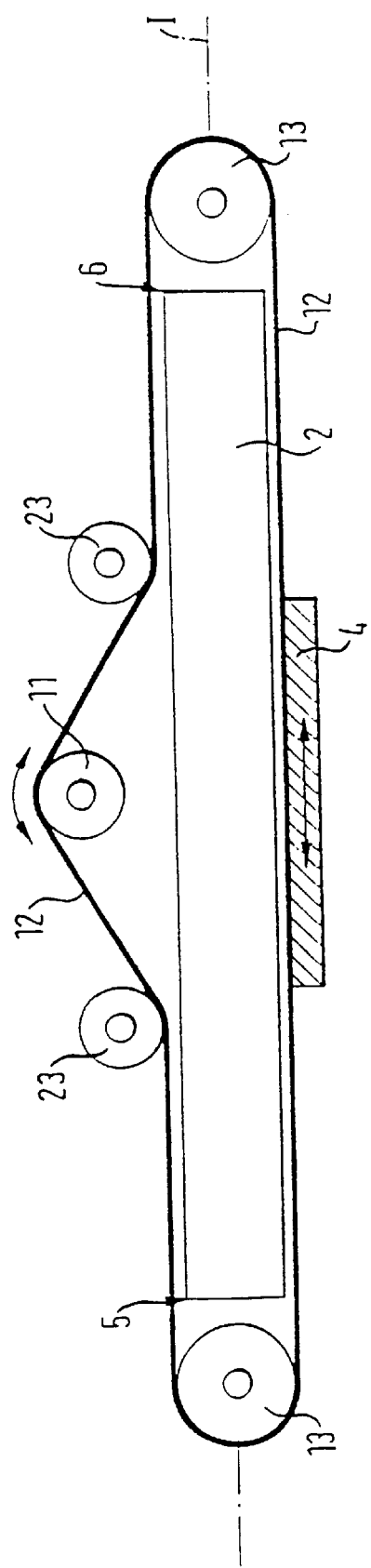
FIG. 3 is a schematic illustration of the gripper carriage drive.

The drive of the gripper carriage 4, which is schematically illustrated in FIG. 3, includes a toothed pulley 11 driven by the drive motor 7 over which a toothed belt 12 is guided which circulates in the longitudinal direction around the arm 2. The arm 2 has, for this purpose, two deflection rolls 13 at its ends, which tension the toothed belt 12. In addition, two further deflection rolls 23 are provided on each side of the belt pulley 11. The toothed belt 12 is guided in zig-zag like manner around the deflection rolls 23 and the belt pulley 11 arranged between them in order to ensure a reliable guidance of toothed belt 12 around the belt pulley 11. Finally, the gripper carriage 4 is so secured to the toothed belt 12 that it is moveable between the two ends 5, 6 of the arm 2 along its underside.

Figure 4:
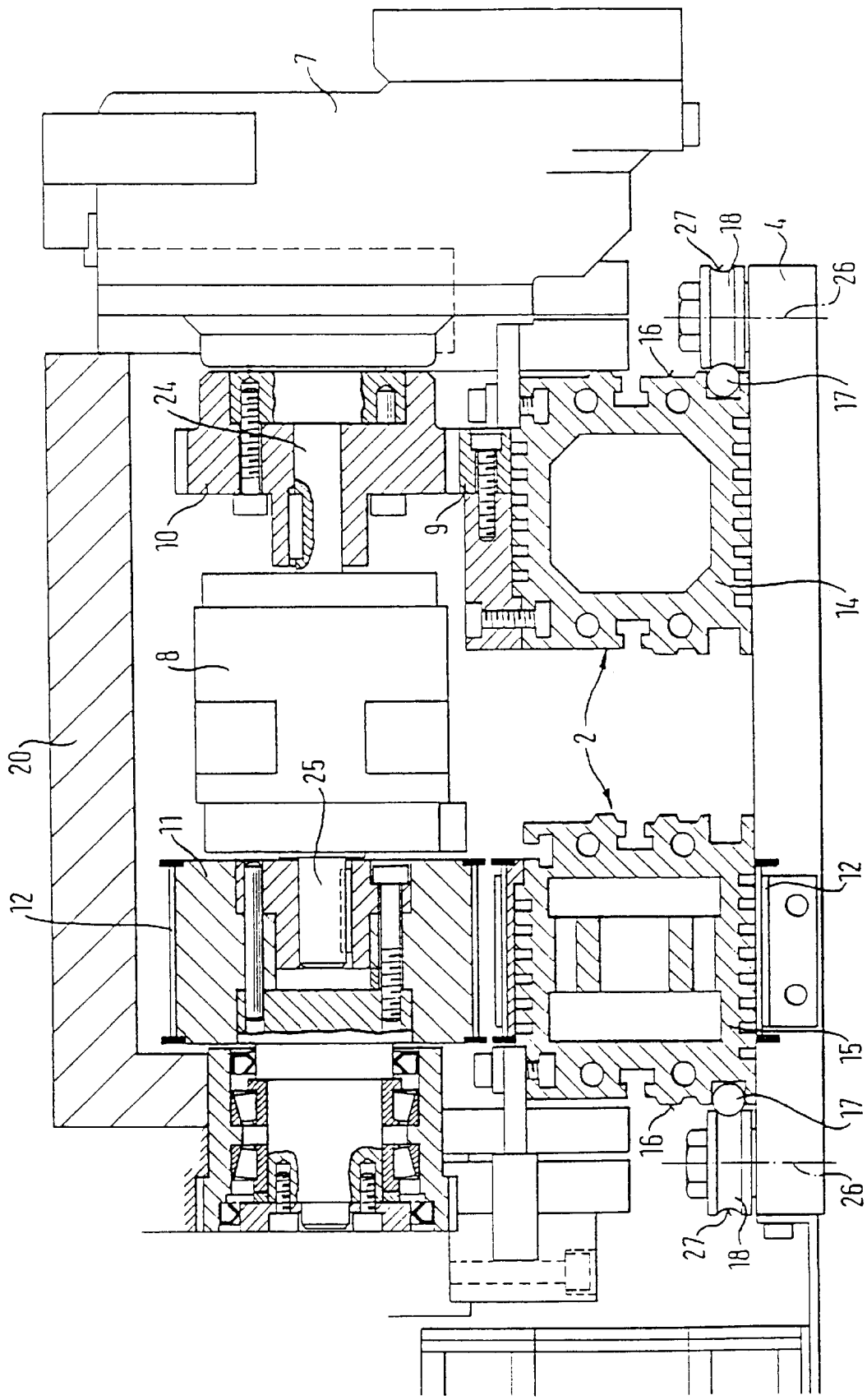
FIG. 4 is a cross section through the arm with drive unit.

In the variant of the loading and unloading apparatus of the invention shown in a partial cross section in FIG. 4, the arm 2 consists of two arm members 14 and 15 which are parallel to one another, which are substantially square in cross section, and which are connected into a frame by transverse beams not shown here. The horizontal drive of the arm 2 is associated with the one arm member 14, and the drive of the gripper carriage 4 is associated with the other arm member 15. The arm member 14 has, for this purpose, a toothed rack 9 at its upper side, in which a pinion 10 meshes. The pinion 10 sits on a drive shaft 24 which is driven by a drive motor 7 arranged at the side of the arm 2. The drive shaft 24 is extended beyond the pinion 10 and connected to an intermediate transmission 8 formed as a planetary transmission.

A further drive shaft 25 on which a belt pulley 11 sits and which is journalled at the other end on the housing 20 is connected to the second side of the intermediate transmission 8. The belt pulley 11 is located above the second arm member 15 in just the same way as two deflection rollers 23, which cannot be recognized here. A toothed belt 12 is guided over the belt pulley 11 and over the two deflection rolls 23 and circulates around the second arm member 15 that is equipped for this purpose with two deflection rolls 13 at its end, which can likewise not be recognized here.

The two arm members 14 and 15 are provided at their two longitudinal sides 16 remote from each other in each case with one round bar 17, which extends parallel to the longitudinal axis I of the arm and serves as a guide for the gripper carriage 4. The gripper carriage 4 arranged underneath the two arm members 14 and 15 is provided with at least 4 running wheels 18 of which, however, only two are recognizable. The running wheels 18 are rotatably journalled in each case about a vertical axis 26 on the gripper carriage 4 and are arranged as pairs on both sides of the two arm members 14, 15. The running wheels 18 have in each case a peripheral groove 27 at their running surface in which the round bar 17 sits. The round bar 17 and the groove 27 thus cooperate as a longitudinal guide and mounting for the gripper carriage 4.

Figure 5:
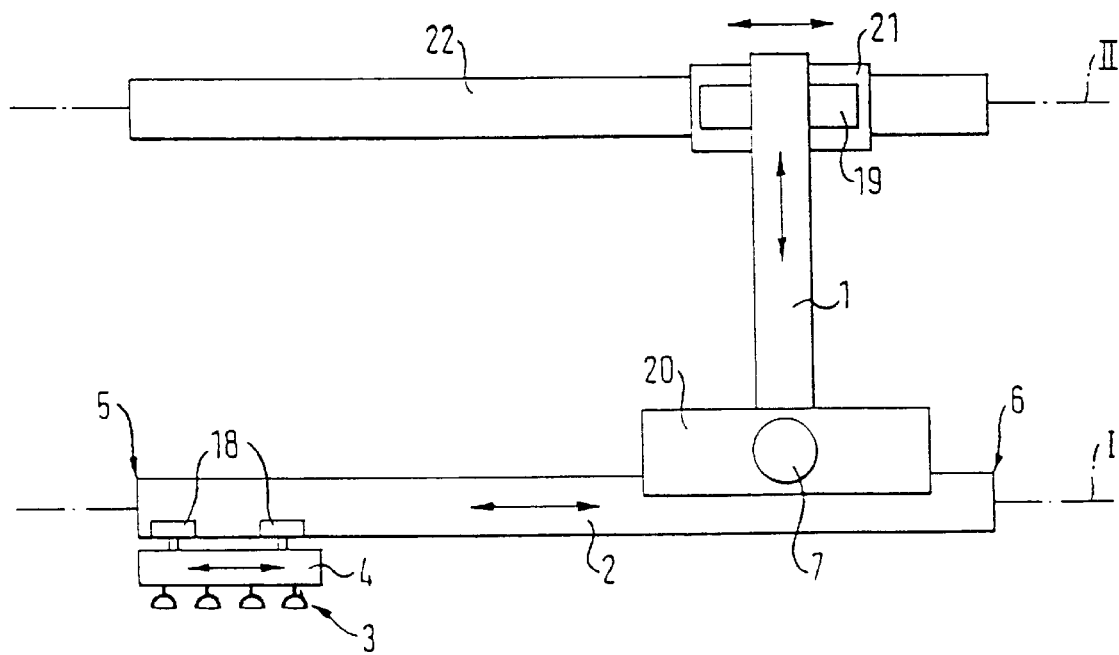
FIG. 5 is a second embodiment of the loading and unloading apparatus of the invention.

In the variant of the loading and unloading apparatus of the invention illustrated schematically in FIG. 5, the holder 19 for the vertical beam 1 is secured to a running carriage 21 which is moveable along a portal beam 22. The portal beam 22 extends parallel to the arm 2 and thus spans the spacing between two adjacent loading and unloading positions. The portal beam 22 can, for example, be secured at its two ends to two adjacent processing machines.

For the loading and unloading of a processing machine, the arm 2 is moved horizontally relative to the vertical carrier 1. At the same time the gripper carriage 4 with the gripper device 3 is moved along the arm 2 in order, when the arm 2 is extended, to simultaneously reach its end position at one end 5 or 6 of the arm. The vertical stroke of the gripper device 3 required for loading and unloading is brought about by movement of the vertical carrier 1 in the holder 19.

In the variant illustrated in FIG. 5, the running carriage 21 is additionally moved in the direction of the longitudinal axis II of the portal beam 22 during a transport of workpieces between two processing machines. In this way, three superimposed horizontal movements of the gripper device 3 result in addition to the vertical stroke. A particularly rapid transfer loading of workpieces between two neighboring processing machines is thereby made possible. The arm 2 first travels during this into the one processing machine, with the gripper carriage 4, the arm 2, and the running carriage 21 being simultaneously moved in the same direction. The workpieces are then grasped by means of the gripper device 3 and lifted. Then the arm 2, the gripper carriage 4, and the running carriage 21 are moved in the other direction until the arm 2 travels into the second processing machine and the gripper carriage 4 has arrived at the other end of the arm 2. The workpieces are now put down. Thereafter, the arm 2 again moves out in order to pick up the next workpiece. A suction gripper can, for example, be used as the gripper device 3.

A very rapid loading and unloading or transfer loading process results with a large horizontal stroke so that very short cycle times are possible.

All drive motors can be formed as AC servomotors or as frequency-regulated motors and equipped with a path measuring system. The movements are freely programmable, in particular via an NC control. In this way a great flexibility can be achieved with small conversion times. For a rapid conversion, a quick change system can also be provided for the gripper device 3 present at the gripper carriage 4.

What is claimed is:

1. A loading and unloading apparatus comprising:

a holder;

a carrier journalled in the holder;

a horizontally extending arm arranged on the carrier, the arm comprising two parallel beams connected to form a frame and defining a longitudinal axis, the carrier being movable vertically relative to the holder and the arm being movable in a direction corresponding to the longitudinal axis;

a gripper carriage connected to the arm and having a gripper device connected thereto, the gripper carriage being guided along the arm and movable between two ends of the arm;

a horizontal drive for the arm including a rack connected to the arm and a pinion journalled at the carrier, the rack and pinion being connected to a first of the two parallel beams;

a drive for the gripper carriage connected to the horizontal drive for the arm via an intermediate transmission, the drive for the gripper carriage including a belt pulley journalled at the carrier and a toothed belt, to which the gripper carriage is connected, that circulates in a longitudinal direction around the arm, the belt pulley and the toothed pulley being connected to a second of the two parallel beams; and a drive motor for driving the horizontal drive for the arm and for the drive for the carriage arranged at a side of the arm;

wherein the arm and the gripper carriage are always driven in the same direction; and wherein the pinion, the belt pulley and the intermediate transmission are arranged in a line extending transverse to the arm.

2. A loading and unloading apparatus in accordance with claim 1, wherein the intermediate transmission is configured such that the gripper carriage and the arm simultaneously attain respective end positions.

3. A loading and unloading apparatus in accordance with claim 1, wherein the arm has two deflection rollers at its ends over which the toothed belt is guided.

4. A loading and unloading apparatus in accordance with claim 1, wherein a round bar is arranged along each of two long sides of the arm as a mounting for the gripper carriage; and wherein at least two running wheels journalled on the gripper carriage are longitudinally displaceably guided along the round bars.

5. A loading and unloading apparatus in accordance with claim 1, wherein the carrier is a vertical carrier.

6. A loading and unloading apparatus in accordance with claim 1, wherein the carrier has a mounting housing at its lower end for the horizontal drive of the arm and for the drive for the gripper carriage.

7. A loading and unloading apparatus in accordance with claim 1, wherein the holder is secured to a device to be loaded and unloaded.

8. A loading and unloading apparatus in accordance with claim 1, wherein the holder is secured to a running carriage that is moveable along a portal beam extending parallel to the arm.

9. A loading and unloading apparatus in accordance with claim 8, wherein the portal beam spans the spacing between two adjacent loading and unloading positions.

* * * * *